US007756556B2

(12) United States Patent
Patel et al.

(10) Patent No.: US 7,756,556 B2
(45) Date of Patent: Jul. 13, 2010

(54) RF ANTENNA INTEGRATED INTO A CONTROL DEVICE INSTALLED INTO A WALL SWITCH BOX

(75) Inventors: Parimal Patel, Brookhaven, NY (US); Warren Guthrie, West Olive, MI (US); Danilo Estanislao, Old Bridge, NJ (US)

(73) Assignee: Leviton Manufacturing Company, Inc., Melville, NY (US)

( * ) Notice: Subject to any disclaimer, the term of this patent is extended or adjusted under 35 U.S.C. 154(b) by 656 days.

(21) Appl. No.: 11/559,646

(22) Filed: Nov. 14, 2006

(65) Prior Publication Data

US 2009/0102677 A1 Apr. 23, 2009

(51) Int. Cl.
*H04M 1/00* (2006.01)

(52) U.S. Cl. ................ 455/575.7; 455/90.3; 455/550.1; 343/700 R

(58) Field of Classification Search ................ 455/90.3, 455/227, 575.1, 575.7, 550.1; 343/700 R
See application file for complete search history.

(56) References Cited

U.S. PATENT DOCUMENTS

| | | | |
|---|---|---|---|
| D183,395 | S | 8/1958 | Koch |
| 3,342,967 | A | 9/1967 | Brand et al. |
| 3,369,524 | A | 2/1968 | Fuehrer |
| 3,706,869 | A | 12/1972 | Sorenson |
| 4,138,684 | A | 2/1979 | Kerr |
| 4,334,171 | A | 6/1982 | Parman et al. |
| 4,672,229 | A | 6/1987 | Skarman et al. |
| 4,924,151 | A | 5/1990 | D'Aleo et al. |
| 4,939,792 | A | 7/1990 | Urbish et al. |
| D310,819 | S | 9/1990 | Watson et al. |
| 5,036,168 | A | 7/1991 | Kikuchi et al. |
| 5,038,081 | A | 8/1991 | Maiale, Jr. et al. |
| 5,059,871 | A | 10/1991 | Pearlman et al. |
| 5,079,559 | A | 1/1992 | Umetsu et al. |
| D323,613 | S | 2/1992 | Cummins et al. |
| 5,101,141 | A | 3/1992 | Warner et al. |
| D331,741 | S | 12/1992 | Fujiyoshi |
| 5,191,265 | A | 3/1993 | D'Aleo et al. |

(Continued)

OTHER PUBLICATIONS

International Search Report in International Application No. PCT/US07/77636, dated Mar. 5, 2008, 11 pages.

(Continued)

*Primary Examiner*—Nhan Le
(74) *Attorney, Agent, or Firm*—Collard & Roe, P.C.

(57) ABSTRACT

A remote control electrical device which can communicate with a remote control device. The electrical control device is adapted to fit into a housing which fits into a wall mounting. The remote control electrical device can comprise a control circuit disposed in the housing, a transmitter disposed in the housing, a receiver disposed in the housing wherein said transmitter and said receiver are in communication with the control circuit. There is also a support plate having an inside face facing into the housing and an outside face facing away from the housing body. The support plate is coupled to the housing, wherein there is also an antenna disposed on the outside face of the support plate. This antenna does not receive any power-line AC frequencies or DC, instead it is capacitively coupled to the rest of the electrical components and disposed on the outside face of the support plate.

25 Claims, 8 Drawing Sheets

U.S. PATENT DOCUMENTS

| | | | | |
|---|---|---|---|---|
| D335,867 | S | | 5/1993 | Rowen |
| D336,894 | S | | 6/1993 | Zaretsky et al. |
| 5,225,765 | A | | 7/1993 | Callaghan et al. |
| 5,239,205 | A | | 8/1993 | Hoffman et al. |
| 5,248,919 | A | | 9/1993 | Hanna et al. |
| 5,319,301 | A | | 6/1994 | Callaghan et al. |
| 5,336,859 | A | | 8/1994 | Wojtanek et al. |
| 5,400,041 | A | | 3/1995 | Strickland |
| 5,430,356 | A | | 7/1995 | Ference et al. |
| 5,510,679 | A | | 4/1996 | Maiale, Jr. et al. |
| D371,123 | S | | 6/1996 | Amundsen |
| 5,530,322 | A | | 6/1996 | Ference et al. |
| 5,736,965 | A | | 4/1998 | Mosebrook et al. |
| D394,042 | S | | 5/1998 | Hwang |
| 5,867,127 | A | | 2/1999 | Black |
| 5,898,407 | A | * | 4/1999 | Paulus et al. ................ 343/713 |
| D412,492 | S | | 8/1999 | Gatchell et al. |
| D416,871 | S | | 11/1999 | Todd |
| 5,982,103 | A | * | 11/1999 | Mosebrook et al. ......... 315/149 |
| 6,046,550 | A | | 4/2000 | Ference et al. |
| 6,091,205 | A | | 7/2000 | Newman, Jr. et al. |
| D435,023 | S | | 12/2000 | Carson et al. |
| D440,207 | S | | 4/2001 | Carson et al. |
| 6,211,626 | B1 | | 4/2001 | Lys et al. |
| D447,123 | S | | 8/2001 | Winkler |
| 6,297,724 | B1 | | 10/2001 | Bryans et al. |
| 6,335,500 | B1 | | 1/2002 | Chi et al. |
| 6,340,868 | B1 | | 1/2002 | Lys et al. |
| 6,347,028 | B1 | | 2/2002 | Hausman, Jr. et al. |
| 6,369,524 | B1 | | 4/2002 | Sid |
| 6,380,692 | B1 | | 4/2002 | Newman, Jr. et al. |
| 6,459,919 | B1 | | 10/2002 | Lys et al. |
| 6,469,457 | B2 | | 10/2002 | Callaghan |
| 6,507,158 | B1 | | 1/2003 | Wang |
| 6,528,957 | B1 | | 3/2003 | Luchaco |
| 6,686,550 | B2 | | 2/2004 | Seki et al. |
| 6,761,470 | B2 | | 7/2004 | Sid |
| 6,798,341 | B1 | | 9/2004 | Eckel et al. |
| 6,901,439 | B1 | | 5/2005 | Bonasia et al. |
| 6,917,167 | B2 | | 7/2005 | Courtney et al. |
| D508,680 | S | | 8/2005 | Savicki, Jr. et al. |
| D518,793 | S | | 4/2006 | Hedderich et al. |
| D518,794 | S | | 4/2006 | Hedderich et al. |
| D518,795 | S | | 4/2006 | Sorenson |
| D519,939 | S | | 5/2006 | Hedderich et al. |
| 7,038,910 | B1 | | 5/2006 | Hodge et al. |
| 7,071,634 | B2 | | 7/2006 | Johnson et al. |
| 7,106,261 | B2 | | 9/2006 | Nagel et al. |
| 7,164,238 | B2 | | 1/2007 | Kazanov et al. |
| 7,166,970 | B2 | | 1/2007 | Johnson et al. |
| 7,170,018 | B2 | | 1/2007 | Ilkhanov |
| D537,795 | S | | 3/2007 | Chen |
| 7,219,141 | B2 | | 5/2007 | Bonasia et al. |
| D563,326 | S | | 3/2008 | Patel et al. |
| D563,904 | S | | 3/2008 | Patel et al. |
| 2001/0015862 | A1 | | 8/2001 | Lynami et al. |
| 2002/0139655 | A1 | | 10/2002 | Balabon et al. |
| 2003/0076281 | A1 | | 4/2003 | Morgan et al. |
| 2003/0233129 | A1 | | 12/2003 | Matos |
| 2004/0002792 | A1 | | 1/2004 | Hoffknecht |
| 2004/0212324 | A1 | | 10/2004 | Callaghan |
| 2005/0043907 | A1 | | 2/2005 | Eckel et al. |
| 2005/0125083 | A1 | | 6/2005 | Kiko |
| 2005/0225496 | A1 | | 10/2005 | Apostolos et al. |
| 2005/0248300 | A1 | | 11/2005 | Walko, Jr. et al. |
| 2005/0280598 | A1 | | 12/2005 | Webb |
| 2006/0049935 | A1 | | 3/2006 | Giannopoulos |
| 2006/0279236 | A1 | | 12/2006 | Johnson et al. |
| 2007/0162536 | A1 | | 7/2007 | Ostrovsky et al. |
| 2007/0227867 | A1 | | 10/2007 | Yang |
| 2007/0262259 | A1 | | 11/2007 | Wu et al. |

OTHER PUBLICATIONS

International Search Report in International Application No. PCT/US07/77796, dated Mar. 14, 2008, 10 pages.

International Search Report in International Application No. PCT/US07/65730, dated Feb. 7, 2008, 10 pages.

Aug. 12, 2009 Office Action in Mexican Patent Application MX/a/2007/003298 (translated portions attached).

Nov. 18, 2009 Office action in Mexican Patent Application MX/a/2007/003298 (translated portions attached).

International Preliminary Report on Patentability, Date of Mailing May 28, 2009 for PCT/US2007/077636 which was filed on Sep. 5, 2007. 7 Pages.

Internationa Preliminary Report on Patentability, Date of Mailing May 28, 2009 for PCT/US2007/077796 which was filed on Sep. 6, 2007. 6 Pages.

* cited by examiner

FIG. 4A
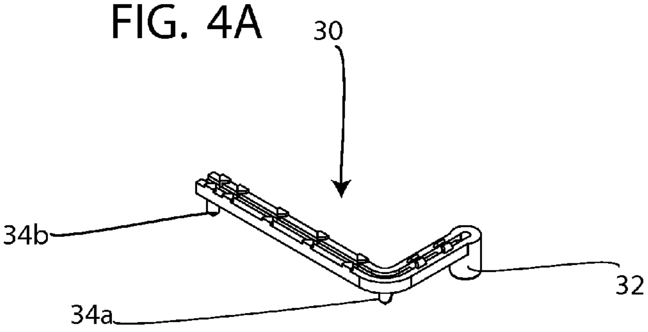
FIG. 4B
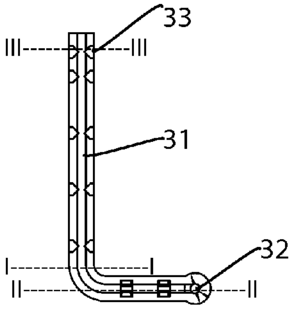
FIG. 4C
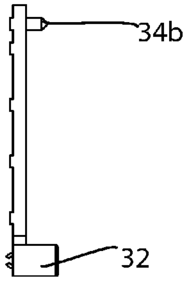
FIG. 4D
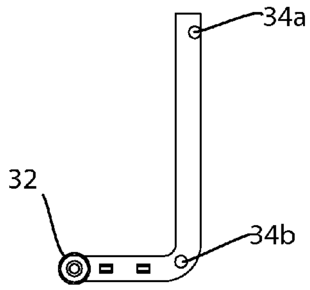
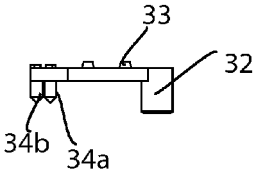
FIG. 4E
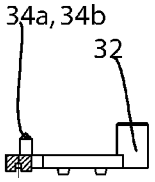
FIG. 4F
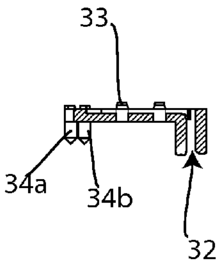
FIG. 4G
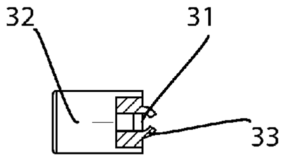
FIG. 4H

RF ANTENNA INTEGRATED INTO A CONTROL DEVICE INSTALLED INTO A WALL SWITCH BOX

BACKGROUND OF THE INVENTION

The invention relates to a device for integrating a compact RF antenna held for transmitting and receiving radio frequency signals, into a wireless lighting control system installed in a standard electrical wall box. Other antennas may generally relate to this field. For example, the following U.S. patents generally relate to the field: U.S. Pat. No. 4,138,684 to Kerr; U.S. Pat. No. 4,939,702 to Urbish et al; U.S. Pat. No. 5,079,559 to Umetsu et al; U.S. Pat. No. 5,400,041 to Strickland; U.S. Pat. No. 5,982,103 to Mosebrook et al, wherein the disclosures of all of these patents are hereby incorporated herein by reference.

A good or effective antenna can create an electromagnetic (EM) field in space. This antenna will have a radiation resistance that is much larger than the loss resistance. In that way, radio frequency (RF) power is dissipated into space as opposed to dissipated in the antenna materials.

In addition, an effective antenna presents suitable impedance to the RF interface circuitry which can usually be at 50 ohms resistance with nearly 0 ohms reactive. This antenna impedance is measured using a network analyzer.

Furthermore, an effective antenna prevents standing waves on the host device by minimizing common mode currents. With the case of a wall switch, the need for low common mode currents is increased so that connections to the device do not cause excessive performance variation.

In most cases, the connection between RF circuits consists of an unbalanced transmission line, such as for example a coaxial cable, or a microstrip transmission line. Unbalanced transmission lines ideally carry differential mode currents only. However because an antenna inherently interacts with the environment, it can excite currents on the ground if not interfaced properly. This can lead to common mode currents.

Proper interfacing will match the antenna to the transmission line. A balanced antenna like a dipole will often include a Balanced to Unbalanced transformer (a BALUN). Other antennas like an “F” antenna naturally interfaces with unbalanced lines.

Common mode currents result in that an unintended voltage is established somewhere besides the antenna. One effect is that the performance can be sacrificed because power can be lost as the voltage induced radio waves are radiated inside of the appliance. Alternatively, destructive interference is established resulting in a highly irregular radiation pattern.

The design of the present invention is in contrast to previous designs which might relate to a traditional F antenna. A traditional “F” antenna naturally interfaces to the unbalanced transmission line by establishing a ground at the surface of the device. There is radiation resistance in the interval between the feed point and the open ended transmission line and the interval between the feed point to the ground connection that establishes the input impedance.

In contrast, the present invention overcomes some of the limitations of the prior art by providing for example, a modified “F” antenna that results in an antenna positioned on a different plane from an antenna feed point.

SUMMARY

The present invention relates to a wireless lighting control system which uses a compact but concealed antenna connected to the lighting control system such as, for example a light dimming system for turning on and off a light or dimming a light to a certain level in response to an external RF signal. In the construction of the antenna of the system, the antenna selected, which resides behind the switch plate, has a length that is less than a quarter of the transmitted or received wavelength. The antenna comprises a single wire antenna that is suitably loaded by the use of stripline-like components to produce a tuned, sensitive antenna for receiving and transmitting RF signals within the local area of the wall switch.

For example the invention can relate to a remote control electrical device such as a wireless lighting system which can communicate with a remote control device. In this case, the wireless lighting system is adapted to fit into a housing which fits into a wall mounting. The lighting system comprises a control circuit and a transmitter disposed in the housing. There is also a receiver disposed in the housing wherein the transmitter and the receiver are in communication with the control circuit. There is also a support plate in the form of a strap having an inside face and an outside face. The strap is coupled to the housing. There is also an antenna, wherein the antenna is adapted to receive signals from the remote control device and transmit signals to the remote control device. This antenna is in communication with the transmitter, and the receiver. In addition, the antenna can be coupled to the outside face of the support plate.

Many of these electrical components are housed on at least one printed circuit board, wherein the control circuit as well as the transmitter and the receiver are disposed on the printed circuit board.

For example, the transmitter and the receiver can be in the form of a transceiver mounted on the printed circuit board. However, this antenna is not mounted on the circuit board but capacitively coupled to the printed circuit board.

Thus, there can be at least two isolating capacitors disposed on the printed circuit board and coupled in series between the antenna and the transceiver.

There can also be an antenna feed point, in the form of a strip line that is capacitively coupled to antenna and disposed on the printed circuit board.

One advantage of the invention is that the strap can extend outside of the housing. The strap is in the form of a plate which can be made from aluminum. Coupled to the strap is at least one antenna coupler. This antenna coupler is comprised of a dielectric material which effectively isolates the antenna from the strap. This antenna coupler includes a channel for receiving the antenna and at least one prong for selectively securing the antenna to the support plate.

In one example embodiment, the antenna can comprise a flexible wire that can be any shape such as in an L shape and disposed inside a thin insulation, and mounted on the strap plate so as to be concealed by the cover plate of the wall switch. The antenna is “tuned” with respect to the ground plane of the printed circuit board of the lighting control, and the metal surrounding the antenna. The antenna is capacitively coupled to the circuit board of the lighting control so as to prevent any electrical hazard with respect to the line voltage supplied to the control circuit. The compact antenna design provides flexibility with regard to changing the color of the frame or wall plate. In addition, because of the presence of the antenna feed point, the antenna is also not disturbed by any hand or body effect located in close proximity to the switch so that there is no detuning of the circuit due to any hand or body effect.

BRIEF DESCRIPTION OF THE DRAWINGS

Other features of the present invention will become apparent from the following detailed description considered in connection with the accompanying drawings.

In the drawings, wherein similar reference characters denote similar elements throughout the several views:

FIG. 4A shows a perspective view of the antenna holder that fits on the outer surface of the strap plate;

FIG. 4B is a top plan view in detail of the antenna holder;

FIG. 4C is a side view of the antenna and its holder of FIG. 4B;

FIG. 4D is a bottom view of the antenna holder of FIG. 4A;

FIG. 4E is a top end view of the antenna holder shown in FIG. 4B;

FIG. 4F is a cross sectional view of the antenna holder taken through the line I-I in FIG. 4B;

FIG. 4G is a cross sectional view of the antenna holder taken through the line II-II in FIG. 4B;

FIG. 4H is a cross sectional view of the antenna holder taken through the line III-III in FIG. 4B;

DETAILED DESCRIPTION OF PREFERRED EMBODIMENTS

Figure 1:
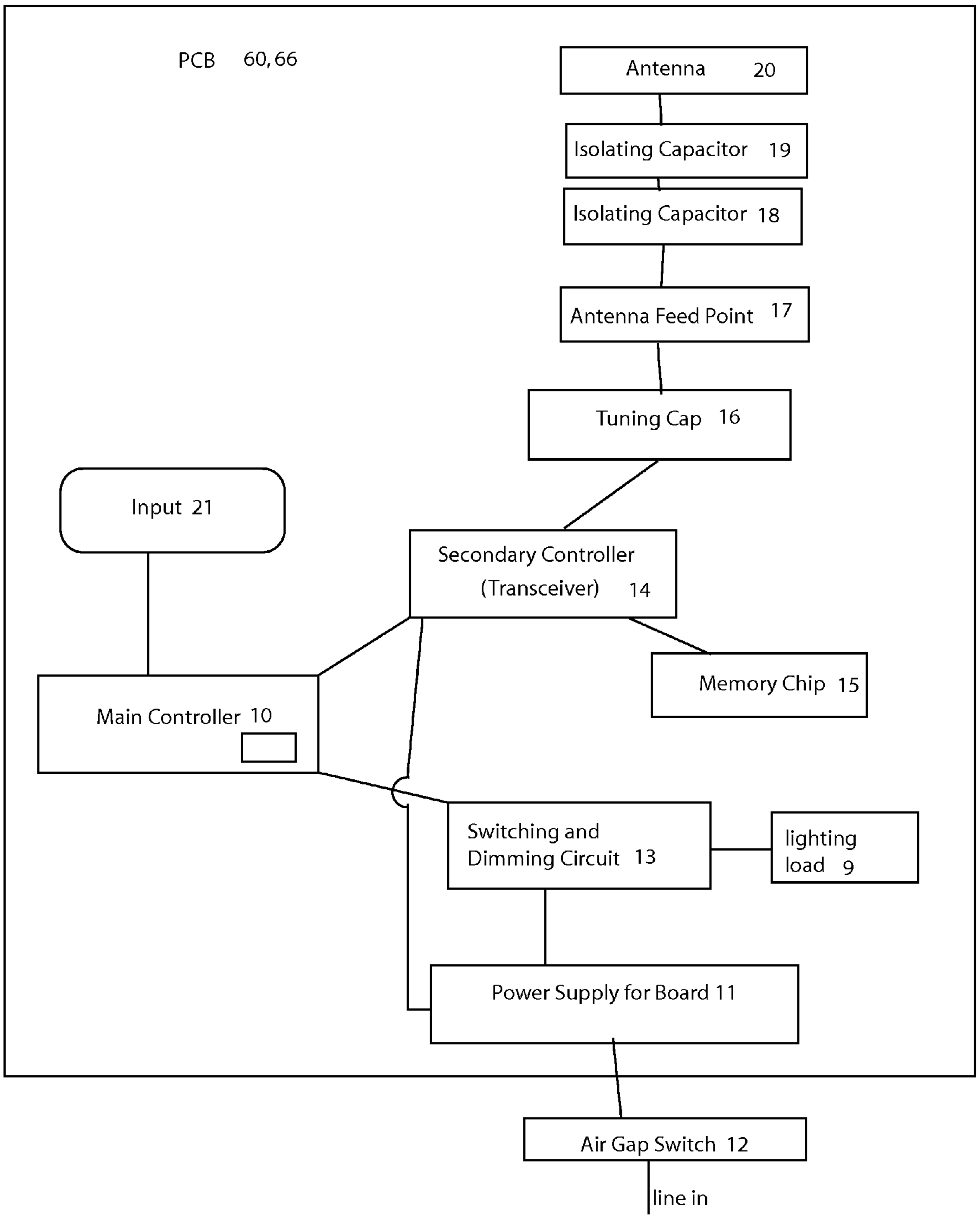
FIG. 1 is an electrical block diagram showing an antenna connected to a switching control circuit.

Referring to FIG. 1, there is shown a block diagram of a preferred embodiment of the present invention showing a main power controller 10, and a power supply 11, which in turn is coupled through an air gap switch 12 to a main power source such as 110 volts AC. Main controller 10 may be any switching control circuit capable of handling the lighting load which is connected to it. The output of main controller 10 connects to a switching and dimming circuit 13, and to a secondary controller or transceiver 14. The antenna circuit comprises a tuning capacitor 16 coupled to an antenna feed point 17, which in a preferred embodiment is coupled to isolating capacitors 18 and 19, however, an antenna circuit in accordance with this invention may be include less than, or more than 2 isolating capacitors. These isolating capacitors are in turn connected to the actual antenna line 20.

Air gap switch 12, which is connected to the 110 volt AC line, is a mechanical switch or relay that will disconnect the power to the control circuitry when the two contacts of gap switch 12 are physically separated, such as when the switch is exposed or opened up for inspection.

Main controller 10 controls the functions of the load. In particular, it can be used to control the amount of power using the switching and dimming circuit 13 directed to the load 9 (for example a dimmer switch, and on/off switch etc). Main controller 10 can include a processor and works in communication with the communication controller and the memory chip.

Secondary controller or RF Transceiver 14 is used to control the wireless communication between antenna 20 and the other logic components such as main controller 10 and memory chip 15.

Memory chip 15 is an EEPROM memory chip that can be in communication with secondary controller 14. This EEPROM is encoded with, and can be used to store the following characteristics: last load status, light level, minimum and maximum settings or other known settings. In this case, the EEPROM also offers power down storage and retrieval of events status during power up. A power supply 11 is shown coupled between switch 12 and the controller and switching circuits. The above circuits would typically be contained on a printed circuit board mounted within the housing of the unit.

Figure 2:
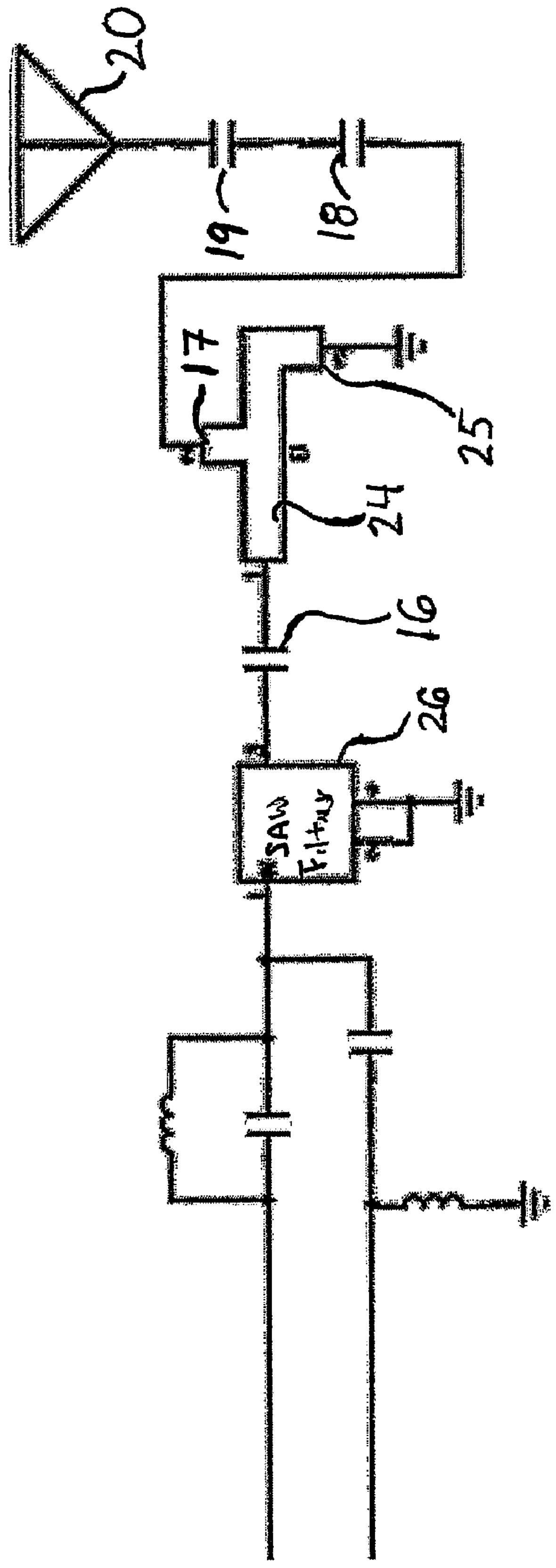
FIG. 2 is a detailed schematic diagram of the antenna and its coupling to the switching circuit.

Referring to FIG. 2, there is shown an example embodiment of an antenna circuitry in the form of a detailed schematic diagram. This diagram shows antenna 20, coupled in series with the two isolation capacitors 18 and 19, which connect to an antenna feed point 17 on a copper plated strip-line buss section 24. One end of strip-line buss section 24 is grounded to the circuit board ground plane 29 (FIG. 3) and forms a ground connection point 25, whereas the opposite end is capacitively coupled through tuning capacitor 16 to a SAW filter 26, the output of which is coupled to transmitter-receiver, or secondary controller 14.

Saw filter 26 is similar to a band pass filter and is tuned to a particular signal to pass on signals of a selected band width.

Figure 3A:
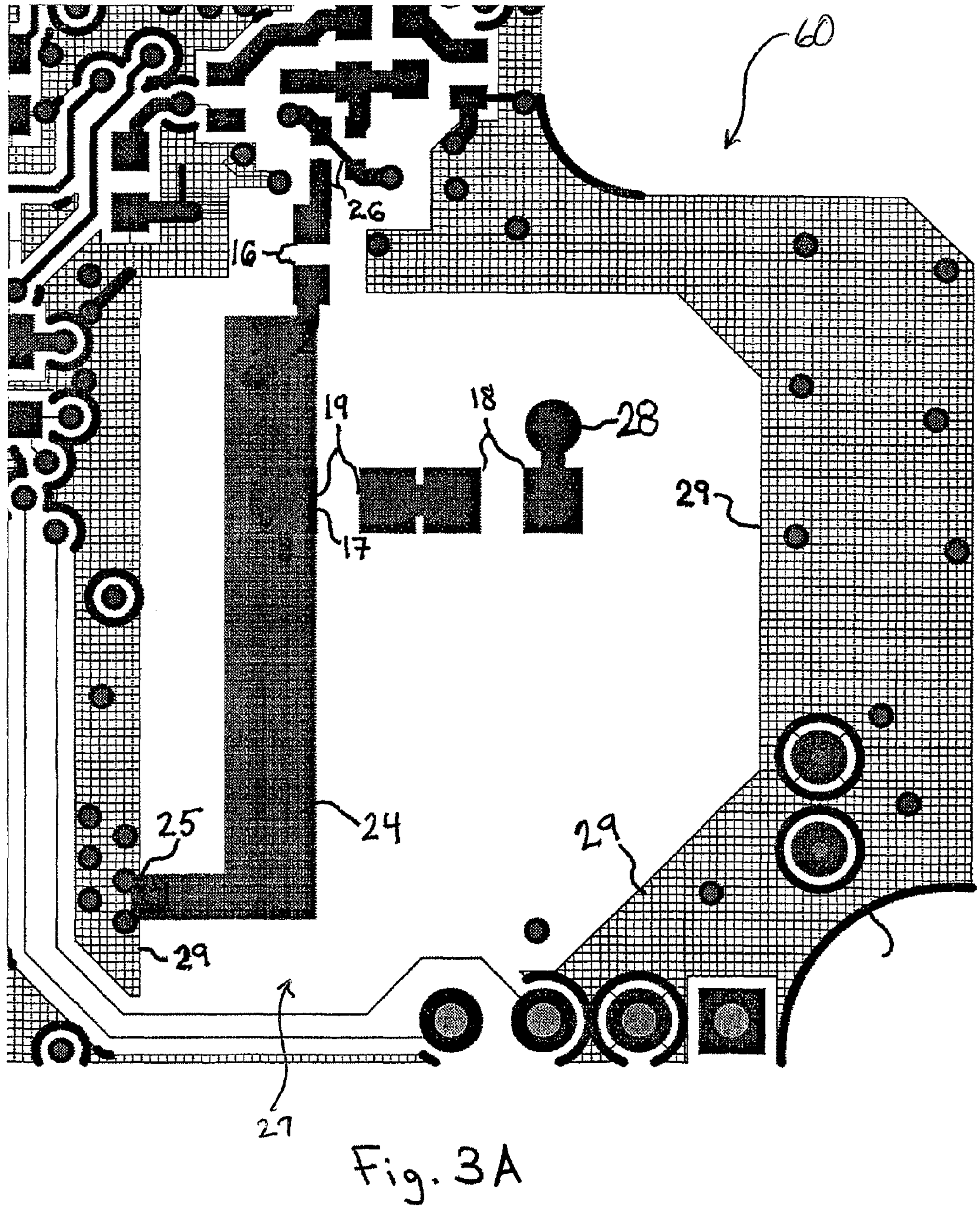
FIG. 3A shows a portion of the printed circuit board of the switching circuit together with the antenna circuitry incorporated within.

Referring to FIG. 3, there is shown an enlarged portion of the electrical printed circuit board 60 which can include the main and secondary controllers 10 and 14 (See FIGS. 1, 2) Circuit board 60, shows the strip-line buss section 24, with one end 25 grounded to the ground plane 29 of printed circuit 26. Surrounding strip-line buss section 24 is a dielectric area 27 of the circuit board which does not include ground plane 29. Near the upper mid-section of strip-line section 24, is shown the antenna feed point 17 which is coupled through isolating capacitors 18 and 19 to an antenna connector 28, which is formed on printed circuit board 60. Antenna connector 28 is designed to be connected to an antenna wire 20 which is extended to fit into an antenna holder mounted on the strap or support plate of the device.

Printed circuit board (PCB) 60 includes a copper plated or conductive ground plane 29 which is an electrically conductive surface that serves as a near-field reflection point for an antenna, or as a reference ground in a circuit. This ground plane helps reduce noise and helps to ensure that all integrated circuits within the system compare different signal voltages to the same potential. This ground plane 29 is shown by the cross hatched area. Another printed circuit board or PCB 50 (See FIG. 6) can also be used to house electronic components of the circuit design.

Antenna 20 is designed for the reception and transmission of control signals at for example, 908 MHz frequency. The antenna is fed single ended and can have an impedance of any other number other than 50 ohms at resonance frequency. Matching to a 50 Ohm circuit includes correctly positioning the antenna feed point which serves as a tap point on a transmission line transformer. It was found that an antenna of 1.67 inches long, which is smaller than the ¼ wavelength of 3.24 inches for that frequency of 908 MHz worked very well. The impedance of the RF transceiver and the SAW filter is approximately 50 ohm at the transmitting frequency.

FIG. 3 shows the structure of the design used which can achieve impedance matching of the circuit. With this design, antenna 20 is shown extending above strap 35 (See FIGS. 5A-8B). This antenna extends down to an antenna connector 28 which is below strap 35. Copper strip line bus section 24 is coupled to antenna connection point 17 and extends across circuit board 60 in a region of open or dielectric area 27. At one end, this strip line 24 is coupled to a ground connection point 25 at a transmission line end. This strip line bus section creates an unbalanced transmission line between the antenna and the remaining electronics.

Ultimately, the benefit of this design is that the radiating part of the transmission line or antenna is above the outer surface of the device. The antenna tap and the feed point 17 are inside of the housing or device. This method reduces the required outer surface area and allows the "loop" between the ground and the feed point to be manufactured on a standard printed circuit board which also simplifies the assembly and reduces cost.

There are various ways to match the antenna impedance. The first method is to use a matching network between the SAW filter and antenna. The matching network can either be a "T" or a "π" structure, or part of that structure. A second method for matching the impedance is the use of antenna feed point 17 wherein the shape of the feed point, the trace width of the feed point, the spacing between the feed point and ground plane and antenna length adjusted during the tuning process will achieve the desirable antenna impedance (50 ohm in our case) and return loss (better than −25 dB at 908 MHz).

The hand/body effect can cause a detuning of an antenna impedance characteristic when there is a human touch to the area close to the antenna.

The design of the antenna system of this invention however avoids the hand and body effect on reception/transmission by its unique design of the antenna feed point. The antenna feed point provides a fixed impedance that is insensitive to the environment, i.e. relatively insensitive to the material of wall box in which the product is installed and insensitive to the presence of other environmental factors such as persons or other metal or plastic objects in close proximity to the antenna.

Referring to FIGS. 4A-4H, there is shown an embodiment of the present invention which is an antenna holder 30 designed in a L-shaped configuration. Antenna holder 30 can be made from any suitable insulating or dielectric material. One example of such material is polycarbonate. Antenna holder 30 has an open slot or channel 31, and a cylindrical coupling 32 at one end for coupling to wire 20 from printed circuit board 60 at terminal 28. Cylindrical coupling 32 has channel 31 extending therethrough to allow antenna 20 to extend down (See FIG. 4G). Antenna wire 20 is pressed or snap fit into slot 31 which can be in the form of a v-shaped slot formed along the length of insulated holder 30 so as to prevent contact with the metal of a strap plate to which it is to be mounted. Wire or antenna holder 30 has locking flanges 33 which extend over slot 31 allowing antenna 20 to be fixed inside of slot 31. Locking flanges 33 are shown in a cross sectional view as extending over channel 31 in FIG. 4H. Holder 30 includes at least 2 insulated mounting pins 34*a* and 34*b* designed to press fit through corresponding holes formed on the outer surface of strap plate 35. Moreover, cylindrical coupling 32 is adapted to fit through a corresponding round hole in strap plate 35. Coupling 32 allows wire 20 of the antenna to pass through strap plate 35 from PC board 60, mounted under the strap plate.

Figure 5B:
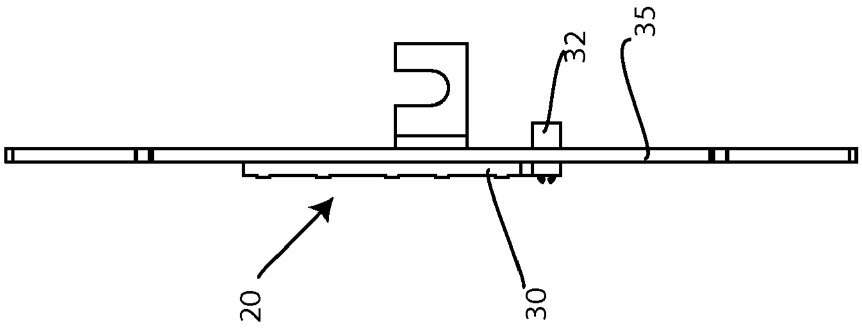
FIG. 5B is a side view of the strap plate containing the antenna.
Figure 5A:
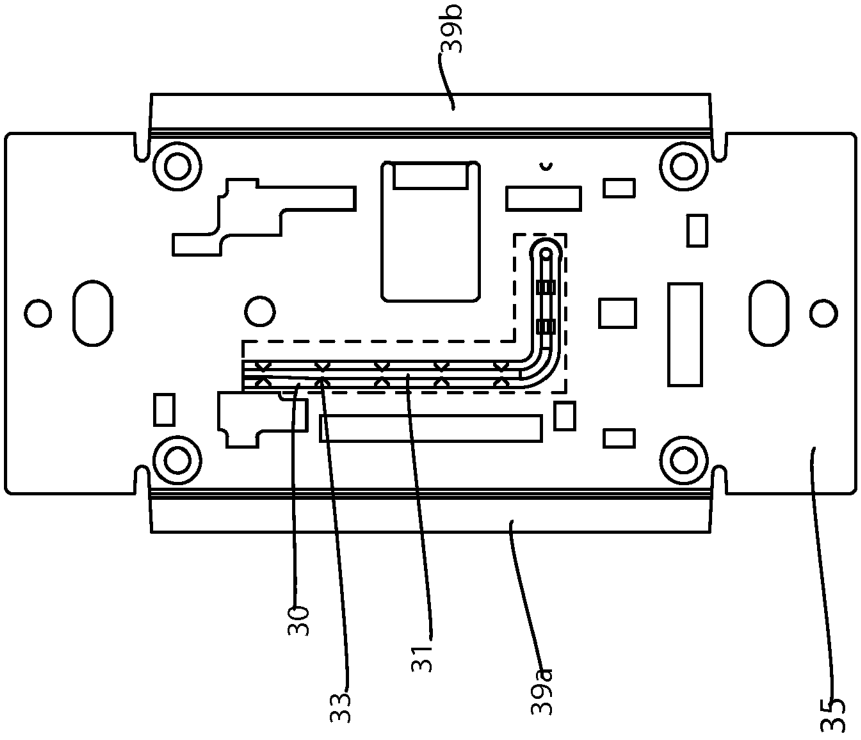
FIG. 5A is a front plan view of the strap plate which fits over the wall box and supports the antenna according to the invention.

Referring to FIGS. 5A and 5B, there is shown an embodiment of the present invention which includes the L-shaped antenna and its holder, which are mounted approximately in the center of strap plate 35. Strap plate 35 can also be referred to as support yoke. This strap plate can be made from any conductive metal such as aluminum, and it can be used as a heat sink to direct heat away from the electronic components in the PCB. Due to the positioning of the antenna, and the use of the wire holder, the strap is preferably designed to extend outside of the housing to dissipate heat, and is located near the outside of the wall box, concealed by the switch cover plate and its associated bezel. FIG. 5B is a side view of strap plate 35 showing the mounting of the antenna holder 30 containing antenna 20, wherein antenna holder 30 has cylindrical coupling 32. This strap plate includes wings or fins 39*a* and 39*b* which are coupled to longitudinal edges of the strap and extend outside of the housing allowing these wings to dissipate heat outside of the housing.

Figure 6:
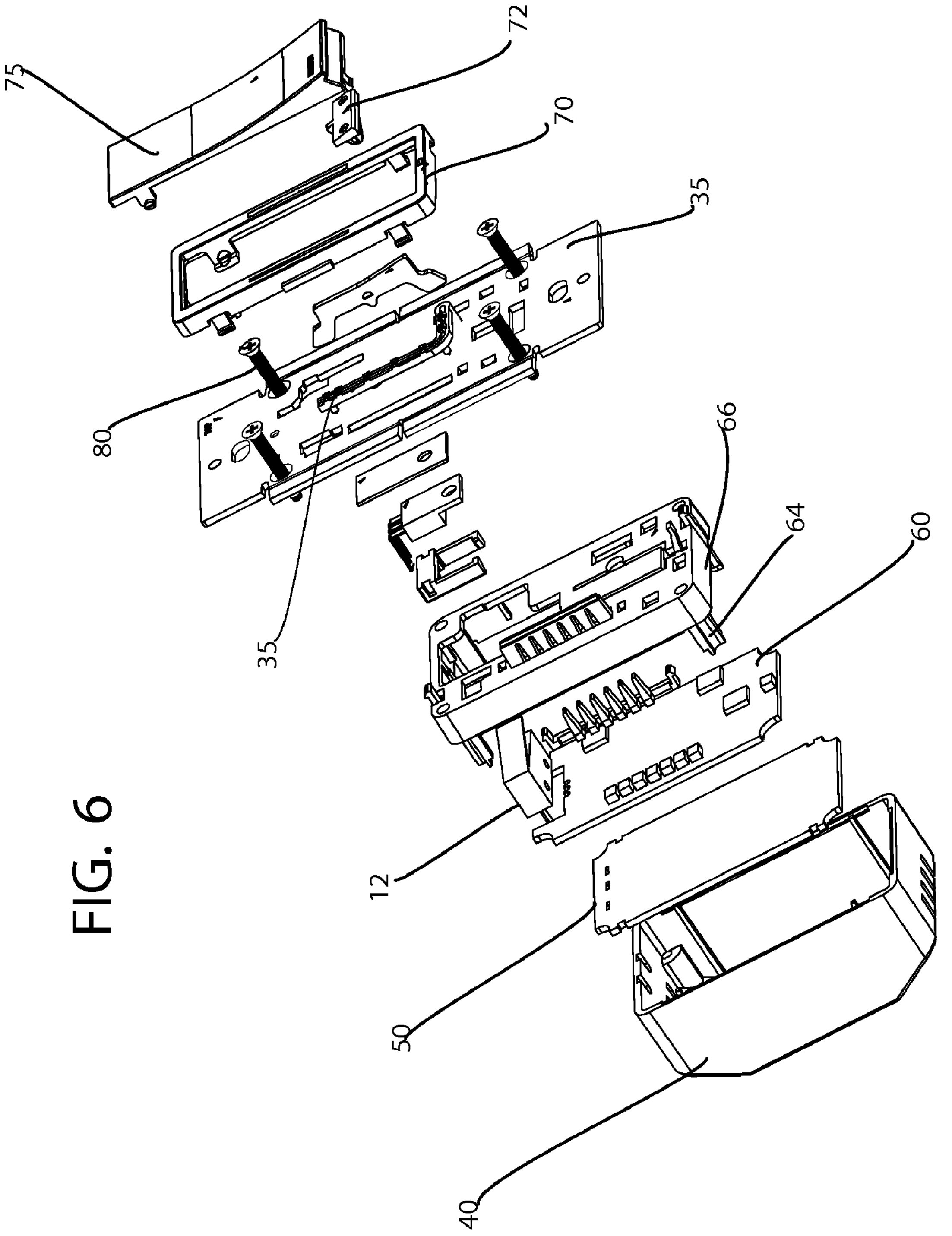
FIG. 6 is an exploded view of the switching control circuit and its housing adapted for mounting in an electrical wall box.

FIG. 6 shows an exploded perspective view of the L-shaped antenna mounted on strap plate 35 and in relation to a particular control circuit and switch for coupling into a standard wall box. The strap plate 35 is shown containing the antenna, and its holder immediately mounted below control switch 75 and its bezel 70.

For example, in this embodiment there is shown a housing 40 which is designed to fit into a wall box, and receive a circuit board 50, a first circuit board 60 having an air gap switch 12, a second board 66 is spaced apart from first circuit board 60 by spacing columns 64. Both circuit boards can be housed inside of housing 40. There is strap 35 which can be coupled to housing 40 via screws 80 and positioned to extend outside of housing 40. As shown in this view, coupled to strap 35 is antenna holder 30 which holds antenna 20 in a position essentially outside of housing 40. Because strap 35 functions as a heat sink for circuit boards 60 and 50, the position of strap 35 outside of housing 40 allows for greater heat dissipation outside of housing 40 creating a greater tolerance for electrical power to pass through circuit boards 60 and 50.

A bezel 70 is coupled to the face of strap 35 which can be used to allow a switch plate 75 to be coupled thereto and house a switch 72 beneath switch plate 75.

Figures 7A, 7B, 7C:
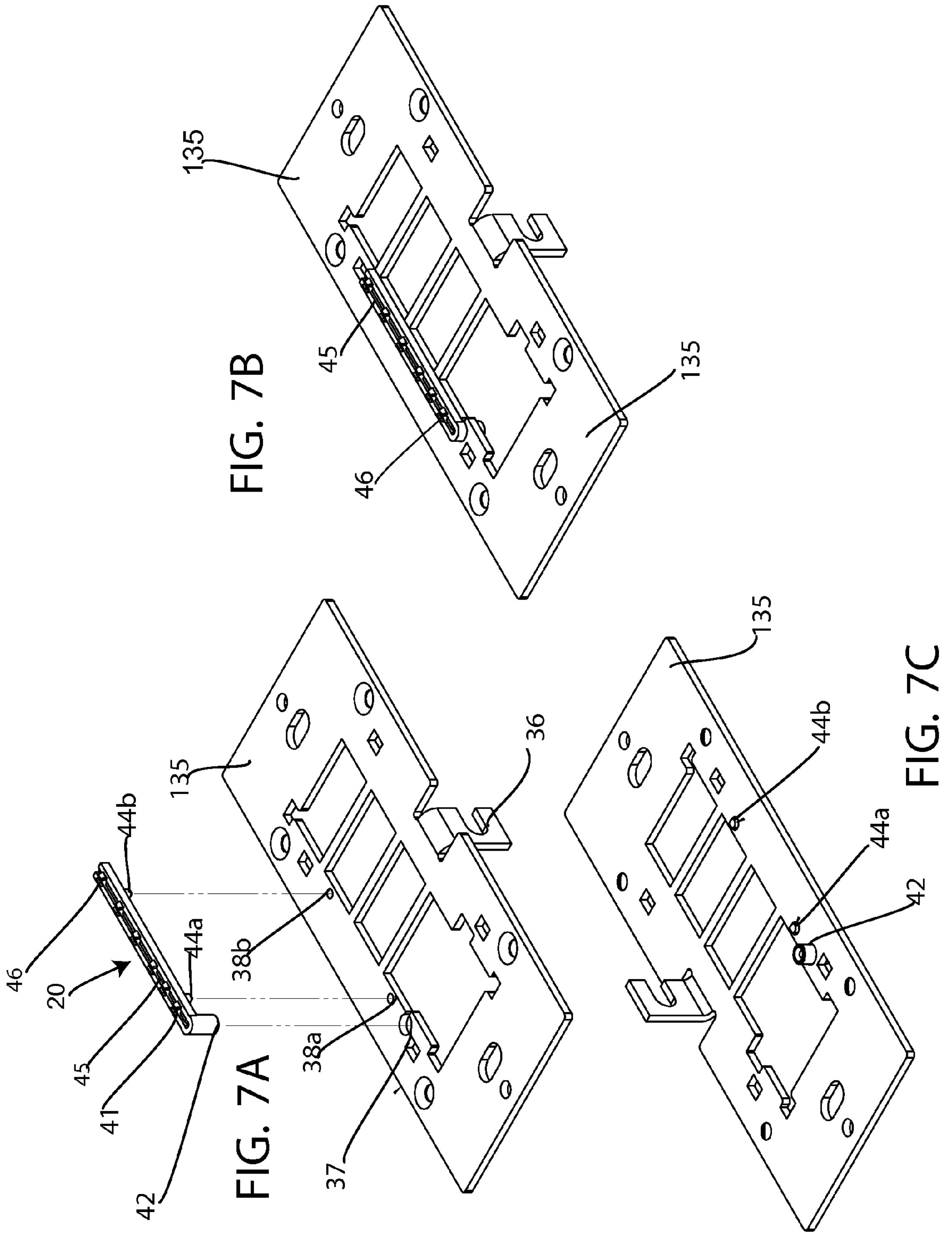
FIG. 7A is an exploded perspective view of another embodiment of the strap and antenna holder for a multi-button switch plate.
FIG. 7B is a perspective view of the antenna holder and switch plate put together.
FIG. 7C is a bottom view of the switch plate and antenna holder combination shown in FIG. 7B.

FIG. 7A shows an exploded perspective view of an alternative embodiment for strap 35, which is shown by reference numeral 135. In this view, there is also a second embodiment for the antenna holder 41 which is shown as a substantially straight antenna holder. Antenna holder 41 includes a cylindrical coupling 42 and connection pins 44*a* and 44*b* which allow antenna holder 41 to connect to strap 135. Strap 135 includes corresponding holes 37 and 38*a* and 38*b* for receiving cylindrical coupling 42 and connection pins 44*a* and 44*b*. As disclosed above, connection pins 44*a* and 44*b* snap fit into these corresponding holes to provide a secure connection. Antenna holder 41 includes a channel or slot 45 and a plurality of locking flanges 46 to allow the antenna to snap fit into channel or slot 45.

FIG. 7B shows a perspective view of this device in a connected condition while FIG. 7C shows a bottom view showing cylindrical connection 42 and pins 44*a* and 44*b* extending through strap 135.

Figure 8A:
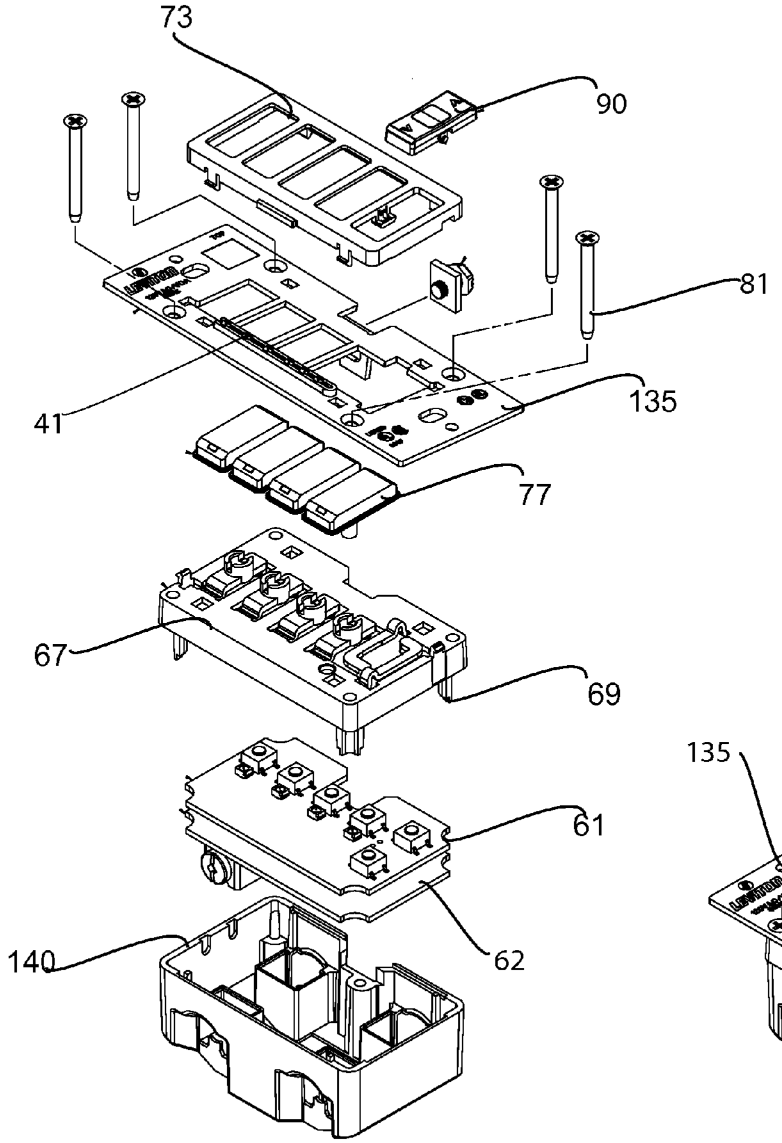
FIG. 8A is an exploded perspective view of a second embodiment of the switch plate.
Figure 8B:
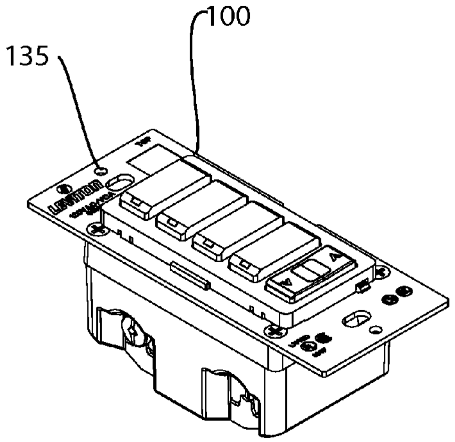
FIG. 8B is a perspective view of this second embodiment with the parts coupled together.

FIG. 8A discloses an exploded perspective view of this alternative embodiment in relationship to another control device. In this view, there is a second housing 140, to circuit boards 61 and 62 which are spaced apart from each other by spacer columns 69. Both of these circuit boards are placed and disposed inside of housing 140 when this embodiment is in an assembled condition as shown in FIG. 8B. A plurality of buttons or actuators 77 can be coupled to circuit board 62 while strap 135 is coupled on top of these components such that in the assembled condition, strap 135 resides outside of housing 140 as shown in FIG. 8B. Disposed on top of strap 135 is antenna holder 41 which is covered by bezel 73 in the assembled condition. A control switch 90 can also be coupled to this device which can serve as a master control for the other components. As shown in this view, strap 135 is coupled to housing 140 and to the other components including circuit board 62 via screws 81.

Thus, with this design, a strap can extend outside of a housing providing a greater heat dissipation from the electronic components inside of the housing while allowing the antenna to be coupled in front of the strap creating greater access to the antenna and improved reception. In addition, because the antenna is capacitively coupled to the electronic components, a user touching this antenna on the strap would not be subject to AC current running through this antenna. Thus this creates a safer, improved wireless system.

Accordingly, while a few embodiments of the present invention have been shown and described, it is to be understood that many changes and modifications may be made thereunto without departing from the spirit and scope of the invention as defined in the appended claims.

What is claimed is:

1. A remote control electrical device which can communicate with a remote control device, the remote control electrical device being connectable to a power source and adapted to fit into a housing which fits into a wall mounting, the remote control electrical device comprising:

a) a control circuit disposed in the housing;

b) a transmitter disposed in the housing;

c) a receiver disposed in the housing wherein said transmitter and said receiver are in communication with said control circuit;

d) a support plate comprising a strap having an inside face facing in towards said housing and an outside face, and being coupled to the housing; and e) an antenna, capacitively coupled to the source of power wherein said antenna is adapted to receive signals from the remote control device and transmit signals to the remote control device, said antenna being in communication with said transmitter, and said receiver, wherein said antenna is coupled to said outside face of said strap wherein said antenna extends from an outside face of said strap to an inside face of said strap.

2. The device as in claim 1, further comprising at least one printed circuit board, wherein said control circuit is disposed on said at least one printed circuit board.

3. The device as in claim 2, wherein said transmitter and said receiver are in the form of a transceiver mounted on said at least one printed circuit board.

4. The device as in claim 3, wherein said antenna is capacitively coupled to said at least one printed circuit board.

5. The device as in claim 4, further comprising at least two isolating capacitors disposed on said at least one printed circuit board and coupled in series between said antenna and said transceiver.

6. The device as in claim 2, further comprising an antenna feed point, disposed on said at least one printed circuit board and being capacitively coupled to said antenna.

7. The device as in claim 6, wherein said antenna feed point is in the form of a strip line disposed on said at least one printed circuit board.

8. The device as in claim 1, wherein said strap is in the form of a plate which acts as a heat sink for the device.

9. The device as in claim 8, wherein said strap is in the form of an aluminum plate.

10. The device as in claim 1, wherein said strap further comprises wings extending outside of the housing.

11. The device as in claim 1, further comprising at least one antenna coupler for coupling said antenna to said support plate.

12. The device as in claim 11, wherein said antenna coupler comprises a dielectric material for coupling said antenna to said support plate.

13. The device as in claim 12, wherein said antenna coupler comprises a channel for receiving said antenna therein.

14. The device as in claim 11, wherein said antenna coupler further comprises at least one prong for selectively securing said antenna to said support plate.

15. The device as in claim 11, wherein said antenna coupler is L-shaped.

16. The remote control electrical device as in claim 1, wherein said antenna is configured such that the source of power is not communicated to an outside face of the strap.

17. The remote control electrical device as in claim 1, wherein said antenna is a single wire antenna.

18. A remote control electrical device which can communicate with a remote control device, the remote control electrical device being connectable to a power source and being adapted to fit into a housing which fits into a wall mounting, the remote control electrical device comprising:

a) a control circuit disposed in the housing;

b) a transmitter disposed in the housing;

c) a receiver disposed in the housing wherein said transmitter and said receiver are in communication with said control circuit;

d) a support plate having an inside face and an outside face, and being coupled to the housing, said support plate extending outside of said housing;

e) an antenna coupler coupled to said support plate;

f) an antenna, coupled to said antenna coupler, wherein said antenna is adapted to receive signals from the remote control device and transmit signals to the remote control device, said antenna being in communication with said transmitter, and said receiver, wherein said antenna is coupled to said outside face of said support plate and extends to an inside face of said support plate.

19. The remote control electrical device as in claim 18, wherein said antenna is configured such that the source of power is not communicated to an outside face of the support plate.

20. The remote control electrical device as in claim 18, wherein said antenna is a single wire antenna.

21. A remote control electrical device comprising:

a) a housing;

b) a strap coupled to said housing and having an inside face facing into said housing and an outside face, facing out from said housing c) an antenna coupled to an outside face of said strap;

d) a printed circuit board disposed inside of said housing; and e) a strip line buss disposed on said printed circuit board, said strip line buss including an antenna feed point wherein said antenna extends from an outside face on said strap to an inside face on said strap and is coupled to said antenna feed point and extends on a plane outside of said housing on an outside face of said strap.

22. The remote control electrical device as in claim 21, further comprising at least one isolating capacitor coupled to said printed circuit board, wherein said antenna is capacitively coupled to said printed circuit board via said at least one isolating capacitor.

23. The remote control electrical device as in claim 21, wherein said antenna feed point is adapted in size and shape so as to achieve a desired antenna impedance.

24. The remote control electrical device as in claim 21, wherein said antenna is configured such that the source of power is not communicated to an outside face of the strap.

25. The remote control electrical device as in claim 21, wherein said antenna is a single wire antenna.

* * * * *